Sept. 7, 1943.  F. J. MORITH  2,328,834
HOSE SUPPORTER
Filed Oct. 7, 1941  2 Sheets-Sheet 1
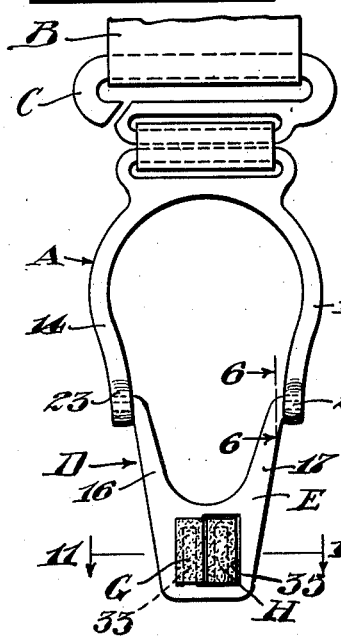
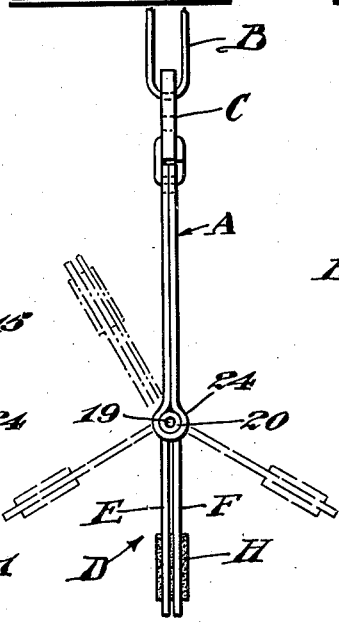
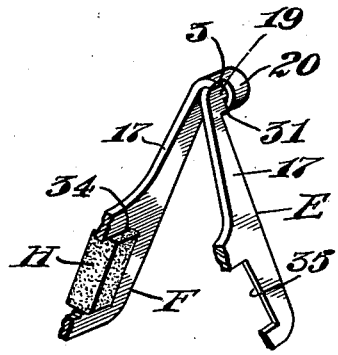
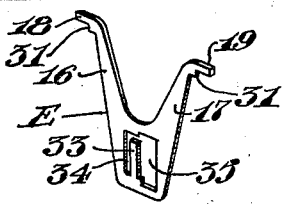
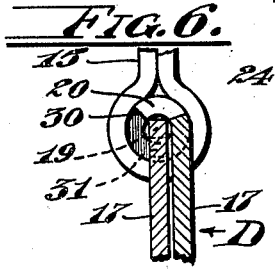
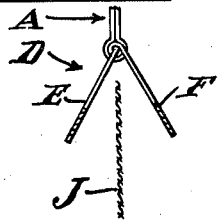
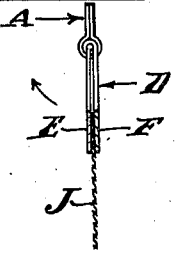
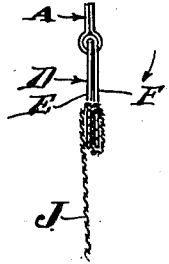
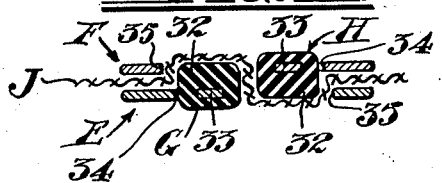
Inventor
Franklin J. Morith
By R. S. Berry
Attorney Sept. 7, 1943.  F. J. MORITH  2,328,834
HOSE SUPPORTER
Filed Oct. 7, 1941   2 Sheets-Sheet 2
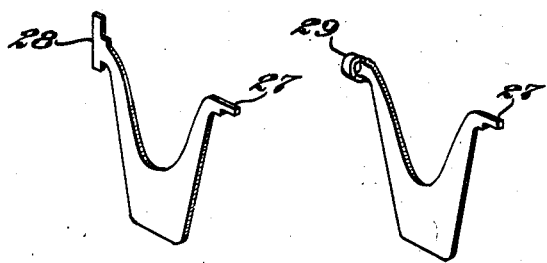
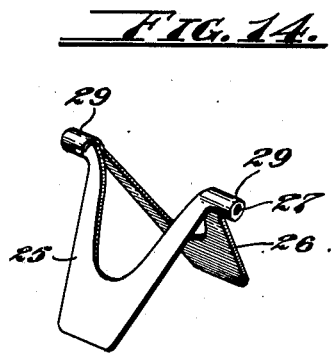
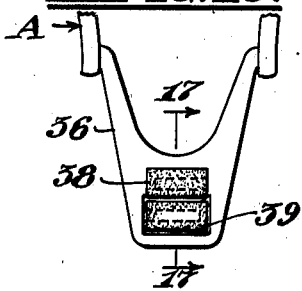
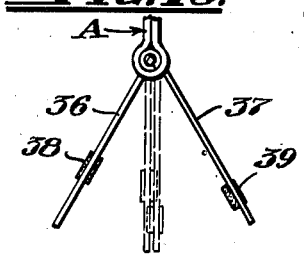
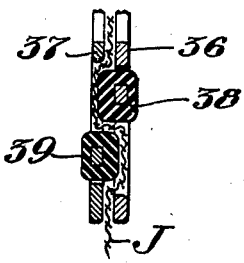
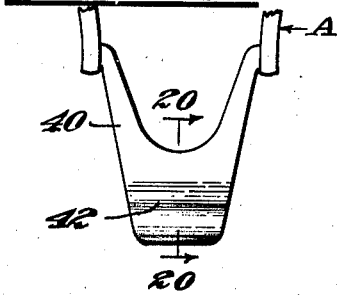
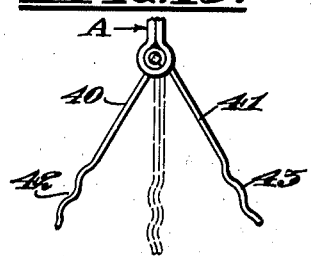
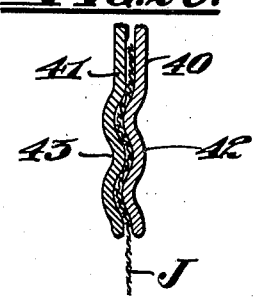
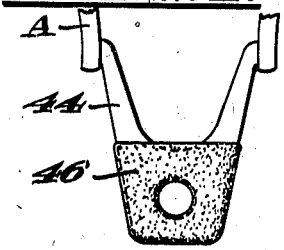
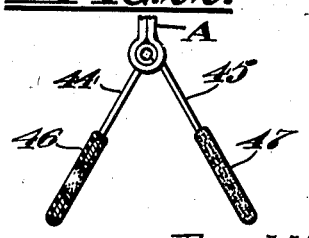
Inventor
Franklin J. Morith
By R. S. Berry
Attorney

Patented Sept. 7, 1943

2,328,834

UNITED STATES PATENT OFFICE 2,328,834

HOSE SUPPORTER

Franklin J. Morith, Los Angeles, Calif.

Application October 7, 1941, Serial No. 413,970

7 Claims. (Cl. 24—243)

This invention relates to a hose supporter or the like and more particularly pertains to a garment holder of the type set forth in United States Letters Patent No. 2,122,141 issued to Eugene F. Holthause on June 28, 1938 and also set forth in Reissue Patent No. 19,930 issued to James G. Tompkins on April 14, 1936, and which type of supporter or holder is characterized by the embodiment of a hose or fabric engaging yoke having an open and an enclosed end, which yoke is pivoted at its open end for swinging movement around its pivotal axis to effect wrapping of a portion of a hose or fabric around the closed end thereof. Hose supporters and garment holders of the above type have come into extensive general use but have met with considerable objection because mere wrapping of the hose or garment around the engaging yoke frequently afforded inadequate attachment between the yoke and the fabric wound thereon since slippage of the fabric and loosening thereof would occur. Various devices have been employed to minimize slippage of the fabric on the engaging yoke but with little success except where a fabric penetrating spur is employed and which latter is highly objectionable since its use is liable to mutilate the fabric. Various forms of friction devices have been applied to the engaging yoke which, when new, are ordinarily satisfactory, but on becoming worn prove ineffectual.

The purpose of the present invention is to provide the fabric engaging yoke with a clamp which is adapted to effect such positive engagement with the fabric to be wrapped around the yoke as to insure against accidental disengagement of the fabric from the yoke.

Another object is to provide a construction in the fabric engaging clamp such that while being adapted to normally grip a fabric will not be liable to occasion injury thereto.

A further object is to provide a fabric engaging yoke in a garment supporter of the character described in which secure engagement with the fabric to be engaged may be easily and quickly effected preliminary to and in a fashion to facilitate wrapping of the fabric on the engaging yoke.

With the foregoing objects in view, together with such other objects and advantages as may subsequently appear, the invention resides in the parts, and in the combination, construction and arrangement of parts hereinafter described and claimed and illustrated by way of example in the accompanying drawings, in which:

Fig. 1 is a view of the hose supporter as seen in front elevation showing the parts in their normal position;

Fig. 2 is a view in side elevation of the hose supporter shown in Fig. 1 depicting in broken lines the mode of manipulating the pivoted fabric engaging yoke;

Fig. 3 is a perspective view of a fragmentary portion of the fabric engaging yoke showing parts thereof in an open or spread position;

Figs. 4 and 5 are perspective views of a pair of jaw members as initially blanked from which the fabric engaging yoke is formed;

Fig. 6 is a detail in cross section taken on the line 6—6 of Fig. 1;

Figs. 7, 8, 9 and 10 are diagrams of the hose supporter in vertical section depicting the parts in various positions assumed in effecting engagement of a fabric therewith;

Fig. 11 is a detail in horizontal section taken on the line 11—11 of Fig. 1 showing the mode of effecting clamping of a fabric in engagement with its engaging yoke;

Figs. 12 and 13 are perspective views showing a modified form of the jaw members for forming the fabric engaging yoke;

Fig. 14 is a perspective view of the fabric engaging yoke as formed by the jaw members shown in Figs. 12 and 13 showing the jaw members in a spread position;

Fig. 15 is a view in elevation of another modified form of the fabric engaging yoke;

Fig. 16 is an end view of the yoke shown in Fig. 15 showing the jaw members thereof in their open position in full lines and in their closed position in dotted lines;

Fig. 17 is a detail in section taken on the line 17—17 of Fig. 15;

Fig. 18 is a view in elevation of a further modified form of the fabric engaging yoke;

Fig. 19 is a view in side elevation of the yoke shown in Fig. 18 showing the jaw members thereof in their open position in full lines and in their closed position in dotted lines;

Fig. 20 is an enlarged detail in section taken on the line 20—20 of Fig. 18 showing the manner of engaging the fabric between the jaws of the yoke;

Fig. 21 is a view in elevation depicting a further modified form of the fabric engaging yoke;

Fig. 22 is a view in side elevation, partly in section, of the yoke shown in Fig. 21 with the jaw members thereof in a spread position.

Referring to the drawings more specifically, A indicates generally a supporting yoke the closed end of which is attached in a conventional fashion to an elastic strip B or other suitable member of a garter, belt, girdle, corset, or the like through the medium of a slotted bar C. A fabric engaging yoke D has its open end pivotally connected to the open end of the supporting yoke A, which engaging yoke D is so formed and so mounted between the side members 14 and 15 of the supporting yoke A that it may be swung completely around its axis and passed through the supporting yoke which latter is dimensioned to permit passage of the yoke D therethrough.

The engaging yoke D is designed to be normally disposed in a pending position relative to the supporting yoke A with its side members 16 and 17 extending normally on a plane with the side members 14 and 15 of the latter as particularly shown in full lines in Fig. 2.

The essence of the present invention resides in forming the engaging yoke D of a pair of coacting U-shaped jaw members E and F of substantially complementary outline and adapted to be positioned in close overlying parallel relation to each other and to be spread apart relative to each other.

As here shown the jaw members E and F are collectively pivoted to swing around a common axis on the free end portions of the side members 14 and 15 of the supporting yoke A. In order to effect pivotal interconnection of the jaws E and F the side members of the jaw E are preferably formed at their outer ends with out-turned trunnions 18 and 19 which are engaged in loops 20 formed on the outer ends of the side members of the jaw F; the latter being initially blanked as shown in Fig. 5 with a pair of parallel tongues 21 and 22 which in assembling the jaw members E and F together are looped around the trunnions 18 and 19 to form the loops 20. In effecting pivotal connection between the assembled jaws E and F constituting the yoke D, the supporting yoke A is formed from a blank which is bent upon itself in a fashion to provide loops 23 and 24 at the extremities of the side members 14 and 15 which loops 23 and 24 loosely encompass the loops 20 as shown in Figs. 1 and 2 to afford the pivotal support for the yoke D.

In some instances the jaw members of the yoke D may be formed of a pair of complementary U-shaped blanks 25 and 26 as shown in Fig. 14; one of the side members of each of the blanks being formed with an out-turned trunnion 27 while the other side member is blanked with an ear 28 as shown in Fig. 12 adapted to be bent to form a loop 29 as shown in Fig. 13 which loop is pivotally engageable with trunnion 27 of the companion jaw member as shown in Fig. 14. The loops 29 thus provided are pivotally engageable with the loops 23 and 24 on the supporting yoke A in the same manner as described with reference to the construction shown in Figs. 1 and 2.

In order to limit the pivotal movement of the jaws E and F relative to each other and thereby obviate excessive spreading thereof, a shoulder 30 is provided on the loop 20 protruding from a side thereof into the path of a shoulder 31 formed at the base of the trunnion engaged in the loop 20; the shoulder 30 being arranged to permit spreading of the jaws E and F relative to each other a distance sufficient to allow insertion of a fabric therebetween.

In the preferred embodiment of the invention shown in Figs. 1, 2, and 3, the jaw members E and F are formed with cushioned fabric gripping members G and H respectively preferably arranged as particularly shown in Fig. 11; the members G and H each comprising a block 32 of resilient material such as rubber mounted on a tongue 33 protruding from a margin of an opening 34 blanked out of the jaw members and with the block protruding from opposite sides of the jaw members in a fashion set forth in the Holthause patent above referred to. A novel and desirable feature of the present construction of the fabric gripping members resides in arranging the gripping members in off-set relation to each other on the jaws E and F and providing a space 35 in continuation of the opening 14 in one of the jaws to receive the inwardly protruding portion of the gripping member on the other jaw, whereby when a fabric is interposed between the jaws E and F and the latter closed thereagainst the portion of the fabric engaged by the gripping members G and H will assume a crimped or corrugated formation which, together with the frictional engagement of the fabric by the gripping members G and H, will insure against slipping of the fabric from between the jaw members.

In some instances, however, the gripping means above set forth may be dispensed with and the jaw members formed flat as shown in Figs. 12, 13 and 14.

In the construction shown in Figs. 15, 16 and 17 the jaw members indicated at 36 and 37 are fitted with gripping members 38 and 39 similar to the gripping members G and H but which in this instance are arranged to extend horizontally across the jaw members instead of in the direction of the length thereof as shown in Fig. 1.

In the construction shown in Figs. 18, 19 and 20, the jaw members indicated at 40 and 41 are formed with corrugations 42 and 43 respectively adapted to interengage each other when the jaws are closed and to effect gripping engagement of a fabric interposed between the jaws as shown in Fig. 20.

In the construction shown in Figs. 21 and 22, the jaws indicated at 44 and 45 are surface coated with a cushioning material forming the jaw members with pads 46 and 47 adapted to effect a cushioned frictional engagement with a fabric interposed between the jaws.

In the application and operation of the invention the supporting yoke A is positioned with the fabric engaging yoke D depending therefrom as shown in Figs. 1 and 2, and with the jaws E and F on the latter spread apart relative to each other as shown in Fig. 7 astride a fabric J to be engaged thereby. The jaws E and F are then closed to effect engagement with the fabric therebetween as shown in Fig. 8, whereupon the jaw members are collectively swung upwardly on the supporting yoke A and passed through the latter as indicated in Fig. 9 and then restored to the normal depending position as shown in Fig. 10. This swinging movement of the jaws E and F constituting the fabric engaging yoke D effects wrapping of the fabric around the closed ends of the yoke D as indicated in Fig. 10 so that on the fabric depending from the yoke being pulled downwardly, or the supporter being pulled upwardly against resistance imposed upon the depending fabric, the jaws will be drawn tightly together so as to securely grip the fabric; the gripping action being increased as the opposed pull between the fabric and the support increases, thus insuring against slippage of the fabric free of engaging yoke.

When it is desired to detach the fabric from the yoke D the latter is swung upwardly in the direction opposite that previously employed in effecting connection with the fabric, and on the yoke D being then swung to the opposite side of the yoke A the jaws E and F on being spread apart the fabric will be released.

I claim:

1. In a garment supporter embodying a supporting yoke, a fabric engaging yoke pivoted at its open end to the open end of the supporting yoke to swing through the latter comprising a pair of pivotally connected U-shaped jaws for positioning astride a fabric to be held by said yoke.

2. In a garment supporter embodying a supporting yoke, a fabric engaging yoke pivotally connected at its open end with the open end of the supporting yoke to swing through the latter to effect wrapping of a fabric therearound comprising a pair of U-shaped jaws pivotally interconnected to swing toward and away from each other and adapted to effect engagement with a fabric interposed therebetween.

3. In a garment supporter embodying a supporting yoke, a fabric engaging yoke pivotally connected at its open end with the open end of the supporting yoke to swing through the latter to effect wrapping of a fabric therearound comprising a pair of U-shaped jaws pivotally interconnected to swing toward and away from each other and adapted to effect engagement with a fabric interposed therebetween, and means for limiting the spreading movement of said jaws relative to each other.

4. In a garment supporter, a fabric engaging yoke comprising a pair of U-shaped jaws pivotally connected at their open ends adapted to be swung toward and away from each other for engaging a fabric therebetween, said jaws being collectively pivoted to swing around the axis of their pivotal interconnection.

5. In a garment supporter, a paid of U-shaped jaw members pivotally interconnected at the ends of their side members to swing toward and away from each other and adapted to engage a fabric interposed therebetween, and a supporting yoke having loops at the ends of its side members in which the pivotal interconnections of said jaws are mounted and through which said jaws may be collectively passed to effect wrapping therearound of a fabric engaged therebetween.

6. In a garment supporter, a pair of U-shaped jaw members one of which is formed with loops on its side members, trunnions on the side members of the other jaw member pivotally engaged to said loops, and a supporting yoke having loops on the ends of its side members in which the first named loops are pivotally mounted whereby said jaw members may be collectively swung through said supporting yoke.

7. In a garment supporter embodying a supporting yoke, a fabric engaging yoke pivotally mounted at its open end to the open end of said supporting yoke to swing through the latter, said fabric engaging yoke comprising a pair of pivotally connected jaws mounted to swing toward and away from each other, a cushion fabric gripping member carried by each of said jaws protruding toward the companion jaw, each of said jaws being formed with a space to receive the protruding portion of the fabric gripping member of the other jaw.

FRANKLIN J. MORITH.